Oct. 14, 1952 L. J. KAMM 2,614,167

STATIC ELECTROMAGNETIC MEMORY DEVICE

Filed Dec. 28, 1949 2 SHEETS—SHEET 1

INVENTOR.
LAWRENCE J. KAMM
BY
[signature]
ATTORNEY

STATIC ELECTROMAGNETIC MEMORY DEVICE

Filed Dec. 28, 1949 2 SHEETS—SHEET 2

INVENTOR.
LAWRENCE J. KAMM
BY
[signature]
ATTORNEY

Patented Oct. 14, 1952

2,614,167

UNITED STATES PATENT OFFICE 2,614,167

STATIC ELECTROMAGNETIC MEMORY DEVICE

Lawrence J. Kamm, New York, N. Y., assignor to The Teleregister Corporation, New York, N. Y., a corporation of Delaware Application December 28, 1949, Serial No. 135,410

5 Claims. (Cl. 177—353)

This invention relates to static memory devices for storing information either in binary or trinary code. The basic feature of the invention resides in the use of a very simple form of an electromagnetic circuit wherein a solenoid surrounds a ferromagnetic core having considerable retentivity; in other words, a high hysteresis characteristic. I preferably use a substantially closed magnetic circuit the permanent magnet portion of which is the solenoid core, the remainder of the magnetic circuit being built up of soft iron laminations.

Any number of digital storage elements, such as described above, may be embodied in a comprehensive system for storing numerous items of information. There are many uses for a data storage system of this type, among which may be mentioned the storage of numbers such as may represent any class of statistical data.

It is contemplated that my system will find utility in connection with the storage of incoming signals from any desired signal source, and where it is desired to interrogate the stored data from time to time without erasing the record.

A feature of my invention is the use of common equipment for interrogating different portions of the record in a comprehensive data storage system, so that it will not be necessary to have as many indicating units as there are storage units; but any group of storage units may be selected at will for read-out purposes.

Accordingly, the principal objects of my invention may be set forth as follows:

1. To provide a memory device for storing information in binary or trinary code, each element of the device being devoid of moving parts.

2. To provide a memory device the digital elements of which are capable of use for the storage of data items for an indefinitely long time and without any need for an external source of power to maintain the record.

3. To provide a data storage system each digital element of which is capable of interrogation to ascertain the information that was previously recorded therein, but without the need for erasing the record, thus permitting repeated examinations of the record to be made.

4. To provide a static memory device each unit of which is of relatively small dimensions, compact in structure, of low cost, and having an indefinitely long life with no appreciable cost for maintenance.

5. To provide a memory system composed of a plurality of digital storage units, means for applying signals successively to the different units, thereby to record a train of signals, and means for examining individual units or a selected group of said units to read out the information therein.

My invention will now be described in more detail, reference being made to the accompanying drawing, in which—

Figures 1, 2, 3:
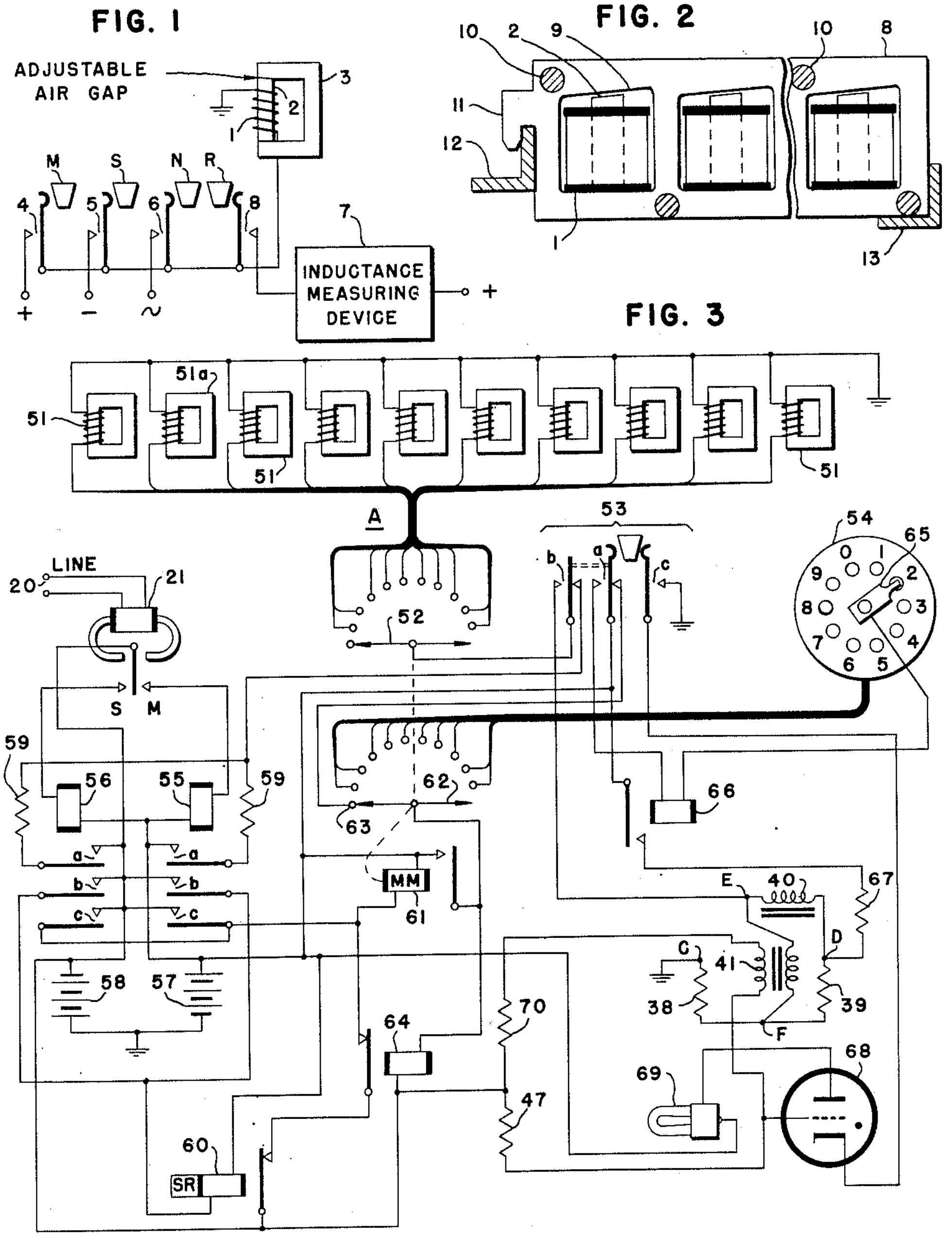
Fig. 1 shows schematically the basic storage unit to be used as a memory device for a single code signal.
Fig. 2 shows an assembly of digital storage units built into a complete magnetic circuit which is composed of laminations and high retentivity cores, each core being mounted within an individual solenoid.
Fig. 3 shows a circuit arrangement which provides utility for a multiplicity of storage units such as shown either in Fig. 1 or Fig. 2.

Referring first to Fig.1, I show therein a static magnetic unit having a solenoid 1 which surrounds a core 2 of magnetically hard material. In order to provide a substantially closed magnetic circuit for the core 2, laminations 3 of soft iron may be used. An adjustable air gap is indicated. This gap is not in all cases necessary but provides a convenient way of adjusting the characteristics of one storage unit with respect to another so that uniform results may be obtained when interrogating a series of such units, one after another.

A method of using a storage unit of the type shown in Fig. 1 is illustrated in one of its simplest forms by the associated circuit arrangement. Several push buttons are here used for selective application of different recording pulses through the winding of the solenoid 1. If the unit is intended to store two kinds of signals, one of these signals, say "mark," may be recorded in the storage unit by feeding a positive potential into the receiving terminal of the solenoid 1, the other terminal being grounded. This signal will, of course, magnetize the core 2 in one direction of orientation. The opposite orientation would be recorded by applying a negative potential to the same receiving terminal of the solenoid. It will thus be seen that push buttom M when depressed, will close its contacts 4 and apply a positive mark signal to the storage unit. Also, the depression of push button S will close its contacts 5, thereby to apply a negative or space signal to the storage unit for record purposes.

The D. C. pulses, either positive or negative, may both be sufficiently strong to produce magnetic saturation. Alternatively, a mark signal may be strongly positive to saturate the core element 2 and a space signal may be relatively weak and negative so as to leave the core substantially de-magnetized. The theory of operation on which this method is based will be discussed in more detail toward the end of the specification.

Still another alternative procedure is to apply direct current pulses of one polarity for recording "mark" signals, and to apply a brief train of alternating current waves so as to demagnetize the storage unit and set it to store a space signal.

Since the core material must possess considerable retentivity, it will be clear that very little of its magnetim will be lost over a period of time. However, it is possible to completely reverse the polarity of the magnet by reversing the current flow in the solenoid. Assuming that the recording pulses have sufficient energy to saturate the magnetic core regardless of its previous condition, then there is no need for performing a separate erasing operation between useful recording operations.

If the storage unit is to be used for recording trinary code, that is, to register signals which are of three kinds, then in addition to the push buttons M and S for mark and space respectively, a third push button N may be used for closing contacts 6, thereby to impress an alternating current upon the solenoid 1. This operation neutralizes any previous polarization of the core 2 and leaves the storage unit in condition to represent a neutral signal such as one having zero significance in cable code.

In order to read out the information stored in a storage unit, I have indicated in the block 7 an inductance-measuring device which may be of any suitable type. The function of this device is to compare the inductance of the storage unit with a known inductance, and thereby to distinguish between one or another polarization of the magnet 2 or to reveal a substantially demagnetized condition therein. The details of various inductance-measuring devices are well known in the art so that for purposes of disclosing the system as shown in Fig. 1 it is sufficient to represent the read-out device as comprising an inductance measuring element 7 in combination with a circuit-closing switch 8 to be operated by the push button R. A more specific example of a read-out device will be presented in describing Fig. 3. As far as Fig. 1 is concerned, however, it will be seen that any one of three conditions may be detected as stored signal elements.

Referring now to Fig. 2, I show therein a laminated structure 8 which may be of any convenient length and may be built up of soft iron or silicon steel punchings in which there are holes 9 having two parallel sides and one end which is somewhat sloped with respect to the other end. The laminations may be fastened together in any suitable manner, as by means of screws or rivets 10. With a view to conveniently mounting these assemblies on a rack, one end of the laminations is formed with lugs 11, the recessed portion of which enables the structure to be slipped over the edge of a horizontal angle bar 12. Another angle bar 13 supports the other end of the structure.

Laminated material for closing a magnetic path is very generally used in devices of this type, but such a path may also be closed through a casting or a machined element of magnetic material, provided that the recording and read-out pulses are direct current pulses, and not alternating currents.

A solenoid 1 surrounding a core 2, preferably of tungsten magnet steel, is mounted within each of the holes 9. The air-gap at the top of the core 2 may be adjusted in thickness by sliding the solenoid laterally within the hole 9. The object of this adjustment has been explained hereinabove. The means for fixing each solenoid in place is not shown, since this is a detail of mechanical construction which is not claimed per se. After finding the proper adjustment of the air-gap, the air-gap itself and the space at the opposite end of the core 2 may be filled with non-magnetic cement for fixing the storage unit in place.

Usually a large number of storage units is to be incorporated into the memory system. Therefore, the multi-unit structure as shown in Fig. 2 possesses a space-saving advantage.

*A typical arrangement of selectively operable storage units*

So far as is known to the applicant, a static magnetic memory device such as shown in Fig. 1, constitutes one element of a novel combination suitable for the storage of a large number of items of information. It is, of course, well recognized that static electro-magnetic elements, if broadly defined as such, would possess no novelty in themselves. But in combination with other elements of structure which enable them to be used in a novel manner it is believed that I can claim an invention. There are numerous ways in which the basic magnetic storage unit may be combined with other components in order to bring out new results. One of the new results obtainable by the use of the herein disclosed invention is to enable statistical data to be stored compactly and permanently, and to be read out at any time subsequent to the recording, the storage elements themselves having no moving parts.

In Fig. 3 ten storage units 51 are shown, by way of example, and each unit may represent a different digit of a binary number or an item of data to be classified. The solenoid windings of these storage units each have one terminal grounded and the other terminal individually connected to a different segment on the upper bank of a rotary switch A. Wiper 52 sweeps over the segments of this bank and is connected to transfer contact *b* of a push button or key switch 53. This switch is shown in its normal position, as for receiving a train of signals to be recorded. A read-out of any individual recording is obtainable by first setting a selector switch 54 on the number corresponding to the digital storage unit 51 which is to be read, and then operating key 53, as will presently be explained in more detail.

A polar relay 21 has its winding connected across a line 20 and responds to incoming signals, of which those that are of positive polarity may throw the armature over to a "mark" contact M, and those of negative polarity would throw the armature to a "space" contact S.

Two relays 55 and 56 are made alternatively operable under control of relay 21 and respond respectively to "mark" and "space" signals, since their windings are individually connected to the M and S contacts of relay 21 and are commonly connected to the positive terminal of a D. C. source having series-connected sections 57 and 58. The negative source terminal has a connection to the armature of relay 21. The connection between the battery sections is grounded.

In relay 55 a front contact of pair *a* is connected to the plus (+) terminal of source section 57. The front contacts of pairs *a* *b* and *c* in relay 56 and those of pairs *b* and *c* in relay 55 are all connected to the minus (−) terminal of source section 58. The movable contact springs of pairs *a* in the two relays 55—56 are interconnected through short-preventing resistors 59 and have a common connection to the normally closed back contact of group *b* in key 53.

Contacts *b* in the two relays 55 and 56 are, one or the other, closable for the purpose of actuating a slow release magnet 60, which draws current from the two sections 57—58 of the D. C. source. The holding characteristic of slow release relay 60 is such that it will not let go during reception of a continuous train of signal pulses, assuming that these pulses are transmitted at a cadence which is usual in telegraphy or in telephone dialing.

Contacts *c* in the two relays 55 and 56 are alternatively closable so as to pulse the motor magnet 61, thereby to step the wipers of switch A over their respective banks of distributor segments. This operation of the rotary switch causes locally generated signal pulses to be distributed successively to different ones of the magnetic storage units 51.

Since relay 55 operates on reception of a "mark" pulse over the line 20, a positive pulse from battery section 57 in this case is fed through contact *a* of relay 55, resistor 59, transfer contacts *b* of key 53, wiper 52 and a conductor leading to a particular one of the storage units 51 and thence to ground. Likewise, the response to reception of a "space" pulse over the line 20 is to operate relay 56 so as to deliver a negative pulse from battery section 58 to one of the storage units 51. Stepping of the wipers in switch A takes place between successive pulses, that is, on release of motor magnet 61.

During the recording of a train of "mark" and "space" signals in the storage units 51, as above described, the contacts of slow release relay 60 will be held open. These contacts are disposed in a homing circuit for motor magnet 61. If the signal train does not contain as many data signals as there are distribution circuits to the storage units, then the release of relay 60 will cause the motor magnet to buzz until wiper 62 reaches a home segment 63. The buzzing operation results from the arrangement of the homing circuit to include break contacts of a relay 64, where this relay is operated by make contacts under control of the motor magnet 61.

If wiper 62 rests on any of the segments of its associated bank other than segment 63, then relay 64 will be energized as a slave to the motor magnet 61, and the break contacts of relay 64 will interrupt the homing circuit of the motor magnet 61 repeatedly, as soon as this homing circuit has been established by the release of relay 60; that is, at the end of the reception of a signal train. So relay 64 operates to interrupt the homing circuit and to cause stepwise advancement of the rotary switch until wiper 62 rests upon segment 63. At this point relay 64 will no longer be released by the opening of the make contacts of the motor magnet 61, because segment 63 is normally fed with positive potential from battery 57 traversing the normally closed contacts *a* of key 53. Relay 64 therefore remains locked up until a subsequent control of the motor magnet 61 is obtained by reception of a new signal train, or otherwise as in making a read-out from the magnetic storage. The read-out procedure will now be described.

*Selective read-out of stored items*

The circuit arrangement of Fig. 3 is designed particularly to meet a possible requirement for individual interrogation of the storage units 51. Selection of any storage unit for read-out purposes is accomplished by the use of a manually operable switch 54, or if desired, by equivalent means such as a set of individual circuit closing keys. The individual points of selector switch 54 are respectively connected to different segments (other than segment 63) in the lower bank of switch A. The movable contact 65 on selector switch 54 is connected through the winding of a relay 66 and thence through a front contact of the transfer group *a* in key 53 so that when this key is operated positive potential will be fed from battery 57 through the key, through relay 66 and through one of the circuits interconnecting switch 54 and the segments of rotary switch A.

Let it be assumed that storage unit 51*a* is to be interrogated. The movable contact 65 will then be set to position #2, as shown in the drawing. Next, key 53 will be operated to establish a circuit from the positive terminal of battery 57 through transfer contact *a* of key 53, through relay 66, through the individual conductor chosen by switch 54, and to one of the segments in the lower bank of switch A which at the moment will be assumed to have no connection with the wiper 62. Interrogation of any storage unit will also be assumed to take place when there is no reception of incoming signals. Hence the wipers of rotary switch A will rest in their home position.

The transfer contact *a* in key 53, when this key is operated, opens the holding circuit for relay 64, this holding circuit being seen to include the homing segment 63 and wiper 62 in rotary switch A.

As soon as relay 64 releases, the buzzing circuit for motor magnet 61 becomes effective and steps the rotary switch wiper 62 to the segment selected by the manually operated selector switch 54. On reaching the selected segment, relay 64 becomes locked up in a circuit which also includes the winding of relay 66. This circuit may be completely traced from the positive terminal of battery 57 through contacts *a* of key 53 through the winding of relay 66, through the manual selector switch 54, through a selected segment and the contacting wiper 62, and through the winding of relay 64 to the negative terminal of battery 58.

The selected point for interrogation of storage unit 51*a* having been reached by rotary switch A, it now remains to detect the polarity of the signal which was magnetically stored in the unit 51*a*. This is accomplished as follows:

The read-out procedure involves the use of a device for detecting whether the magnetized core in unit 51 has its magnetic orientation set one way or the other. A relatively weak current is fed through the solenoid of a selected storage unit. A bridge circuit includes the inductance of the solenoid and also a fixed inductance with which it is to be compared. The bridge may be balanced for one of the two orientations of magnetization of the core in the storage unit 51. The other orientation will then be detected by noting an unbalance of the bridge. In this way the storage of "mark" and "space" pulses in any unit 51 may readily be distinguished.

Figure 4:
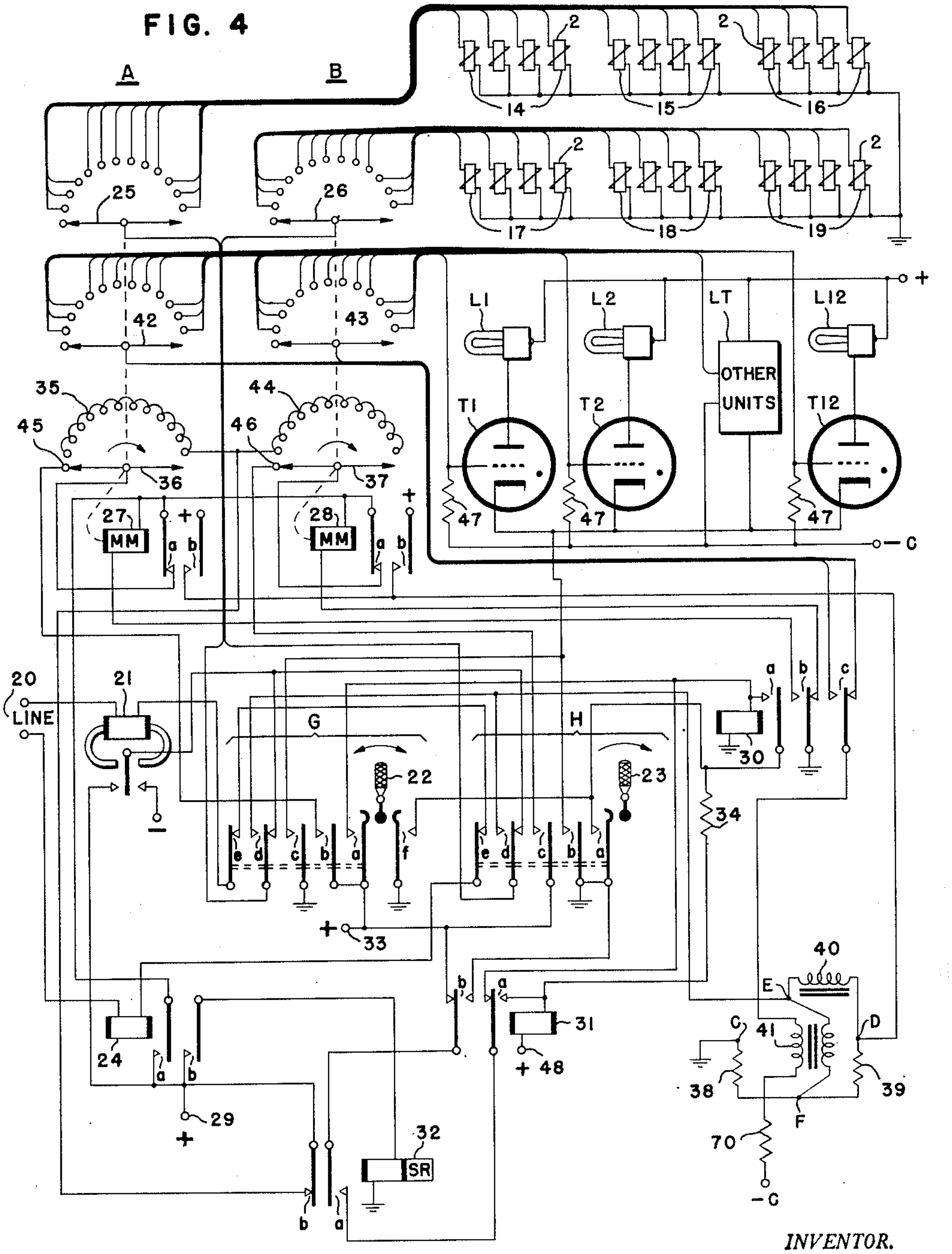
Fig. 4 shows a modified circuit arrangement for utilizing my novel storage units under somewhat different conditions than those for which the circuit of Fig. 3 is best suited.

In Figs. 3 and 4 I show a Wheatstone bridge network having two parallel branch circuits, the terminals whereof are interconnected at one end at a grounded junction point C. At the other end of the branches they are interconnected at junction point D. When the contacts of relay 66 are closed, as by operation of key 53, positive potential from battery section 57 is supplied through resistor 67 to the bridge terminal D.

The network branch which extends through junction point F comprises two substantially equal resistors 38 and 39. The other branch includes an arm which is connected between junction points D and E and comprises an inductive element 40 which is to be compared with the inductance of one of the storage unit 51. Since the network junction point C is grounded and all of the windings of the storage units have grounded terminals, selection of any storage unit, say 51*a* for purposes of comparison with the inductance unit 40 is made possible by the selective setting of rotary switch A under control of the manual selector switch 54, as above described. This connection in the case of storage unit 51*a* may be traced from junction point E through contacts *b* of key 53, thence through wiper 52 in rotary switch A and through an individual segment which is connected by this wiper to the selected storage unit 51*a*.

If the interrogation of a storage unit 51 occurs when it has stored a negative or "space" signal, it will be found that its inductance and that of the network arm 40 will be in balance. Therefore, no current will flow through the primary winding of a transformer 41, this primary winding being connected between junction points E and F of the bridge network. If, however, a positive or mark signal has been stored in the storage unit 51 the interrogation pulse will develop an unbalance in the network, so that a pulse will flow through the primary winding of transformer 41 and induce an output pulse which may be utilized in triggering a gaseous trigger tube 68, as shown in Fig. 3.

Trigger tube 68 is prepared for action by closure of contacts *c* in key 53, whereby a ground connection is established to the cathode of tube 68. An anode circuit for this tube extends from the positive terminal of battery section 57 through the filament of an indicator lamp 69. If the bridge network happens to be balanced, then the circuit closures incident to the operation of key 53 will not cause any appreciable current surge through the windings of transformer 41. The secondary of this transformer is connected in series with resistor 70 between the negative terminal of battery section 58 and the grid of the trigger tube 68. In the absence of a current surge through transformer 41 the grid of tube 68 remains negatively biased below the ignition threshold. So lamp 69 will remain extinguished to indicate the storage of a "space" signal in the unit 51*a*. On the other hand, if the bridge circuit shows an unbalance because of the reversal of polarity in the storage unit 51*a*, then tube 68 will be triggered and the lighted lamp 69 will indicate that a "mark" pulse was stored. The control circuit for the grid in tube 68 includes two resistors 47 and 70, both connected to the negative terminal of battery 58, and in series with the secondary of transformer 41, so as to normally maintain this grid negatively biased with respect to the grounded cathode. As hereinbefore stated, a storage unit may be used for recording three different kinds of a signal, viz, direct current marking and spacing signals of opposite polarity and neutral signals produced by an alternating current impressed upon the solenoid of the unit. By suitable choice of the inductance 40 of the network of Fig. 3 the bridge may be used to determine whether the selected unit 51*a* is saturated or unsaturated, or whether it is saturated in one direction or in the opposite direction, whereby an indication may be obtained as to whether one or either of the other two of the alternative inductance effects is present in the storage unit. Since only a single lamp 69 is shown in Fig. 3, a choice must be made as to which method of operation is desired.

On restoring key 53 to normalcy the opening of its contacts C causes the gaseous tube 68 and the indicator lamp 69 to be extinguished. The transfer contacts *a* of key 53 will now be set to open the series circuit through the windings of relays 66 and 64, thus releasing these relays. Motor magnet 61 then has its buzzing circuit established through contacts of relays 64 and 60. Switch A is then restored to its home setting with wiper 62 resting on segment 63, and on reaching that segment relay 64 is again locked up in the manner previously described.

Any selected ones or all of the storage units 51 may be tested for read-out purposes by further manipulation of the selector switch 54 and the key 53 in the same manner as above described.

Means not shown in Fig. 3 may be provided for isolating the storage units 51 from the effects of incoming signals while obtaining a read-out. Such means when applied to the embodiment of Fig. 3 may be substantially in accordance with what I shall hereinafter describe in reference to the embodiment of Fig. 4.

Fig. 4 shows a modified embodiment of the invention. For illustrative purposes I have represented six groups of storage units, 14 to 19 inclusive, where each group includes four such units and may therefore be sufficient for the codification of as many as 16 numerals, using the binary system. Suppose, for example, that the signals to be stored are applied in trains, each train having 12 elements and each element being either a mark or a space signal, such as used in code telegraphy. While as many as sixteen different combinations of the code elements are available, using a 4-unit code, only ten are needed for codifying different numerals of a digit. Thus groups 14, 15 and 16 are sufficient for storing any 3-digit number. Another 3-digit number may be simultaneously stored by the use of storage unit groups 17, 18 and 19.

Incoming signals as applied through a line 20 may be distributed in any suitable manner so as to have access to the different storage units. For illustrative purposes, however, I have shown that this access may be obtained through the use of two rotary switches A and B and through the relaying of locally derived plus and minus potentials into separate input circuits for the respective storage units, according to the sweeping of rotary switch wipers over the segments of their respective banks.

The line 20 extends through the winding of a polar relay 21, through a normally closed contact pair *e* in a read-out key G, through normally closed contacts *e* in a similar read-out key H, and thence through the winding of a relay 24, returning to the source of signals. The armature of relay 21 is normally held in a mid-position in the absence of signals. A mark signal throws the armature over to a contact which is fed with a positive potential. A reverse throw of the armature makes contact with a negative contact point. Thus, positive or negative potentials may be applied by the control of relay 21 in response to incoming signals, and these positive or negative potentials are distributable through one or the other of two wipers 25 and 26, according to the stepping of these wipers by means of motor magnets 27 and 28 respectively.

The signals as used in the instant embodiment of my invention will be presumed to be discrete pulses, either of positive or negative polarity. The discrete pulses, when traversing the winding of relay 24, actuate this relay regardless of polarity. Thus positive potential from a D. C. source terminal 29 is applied pulsatively through contacts *a* of relay 24 and thence to one or the other of the windings of motor magnets 27 and 28. Return circuits for these magnets are alternatively closed to ground by the operation and release of a relay 30.

The transfer contact of group *b* in relay 30 is grounded, thus completing the circuit for one or the other motor magnet 27 and 28 to provide step-by-step actuation of one or other of two rotary switches A and B. Relay 30 is mated with another relay 31 in a circuit arrangement which is under control of contacts *a* in a slow release relay 32. Relay 32 is energized by the closure of contacts *b* in relay 24 on the first of twelve pulses in a train of signals representing in 4-unit code the numerals of a 3-digit number, such as may be recorded on the storage units 14, 15 and 16. For purposes of illustration it will be presumed that a transmitted train of signals for storing one 3-digit number is separated from a succeeding signal train by a short pause sufficient for slow release relay 32 to be released. It will also be presumed that the succession of signal elements is sufficiently rapid so that relay 32 will be held its in operated condition for each train of signals, despite the pulsative response of relay 24 to each individual signal element.

On the basis of the above assumptions the relay pair 30—31 is operative to provide alternate conditioning of the rotary switches so that switch A will first be cycled step-by-step, then switch B will be cycled in the same manner. A train of signals representing a 3-digit number may thus be distributed through one or the other of switches A and B to their respective storage units.

The return circuit for motor magnet 27 is extended to ground through the front contact of contact group *b* in relay 30. This relay is to be energized at the commencement of the first train of signals. To do this, the slow release relay 32 on being operated applies positive potential from terminal 33 through back contact of a transfer group *b* in relay 31, and thence to contacts *a* in relay 32, the circuit being traced from that point to transfer contacts *a* in relay 31, the back contact thereof, and through the winding of relay 30 to ground. Relay 30, therefore, pulls up immediately upon receipt of the first signal element of the first train. This completes the circuit of motor magnet 27. At the end of the first pulse, relay 24 releases and opens the circuit of motor magnet 27, causing its rotary switch to make one step. It should be understood that the first pulse of the signal train is merely a start pulse and does not transmit any intelligence. The second and succeeding pulses are to be regarded as having "mark" or "space" characteristics for the purpose of storing code elements in the storage units which will signify the binary digits "1" or "0" respectively.

The positive potential derived from terminal 33 and fed through the circuit above described for actuating relay 30 will hold this relay until relay 32 releases. Relay 30, however, has a locking circuit through its contacts *a* and through a resistor 34, thence through the winding of relay 31 to a positive source terminal 48. Incidentally, all terminals such as 29, 33 and 48, and any others which are marked with a plus (+) sign, may be connected to a common direct current source. Similarly, in Fig. 4 all ground symbols are intended to represent the negative terminal of the same source.

Before relay 30 could be released by the opening of contacts *a* in relay 32 its locking circuit becomes effective, since positive potential then flows from terminal 48 through the windings of relays 31 and 30 in series, and thence to ground. Relay 31 pulls up at this time and its movable contact *b* is switched so as to supply negative (instead of previously positive) potential to the movable contact *a* in relay 32. When relay 32 is next operated and held during reception of a succeeding signal train the negative potential supplied through its own contacts *a* to front contact of group *a* in relay 31 causes this relay to be locked up. Relay 30 now releases because it no longer receives a positive potential through its locking contacts *a*.

When relay 30 releases, its transfer contacts *b* are suitably set for completion of the operating circuit of motor magnet 28. Hence this motor magnet is now prepared for stepwise advancement of rotary switch B, thereby to apply polarizing potentials, according to the sense of the incoming signals, successively to the storage units of groups 17, 18 and 19. When this train of signals has been received, the release of slow release relay 32 removes the locking potential from the winding of relay 31, thus restoring the condition of de-energization of the two relays 30 and 31 and preparing the equipment to again receive incoming signals in the order above described.

When the stepping of rotary switch A is in progress the incoming signals, as applied to the polar relay 21, cause positive or negative potentials to be applied through transfer contacts *d* to key G, and thence to the wiper 25 and contacts of the uppermost bank in rotary switch A, from which circuit connections are completed through the respective windings of the storage units 14, 15 and 16 to ground. If for any reason the train of signals should be interrupted and the rotary switch fail of stepping to its home position, the release of relay 32 will have the following effect: its contact pair *b* supplies positive potential from terminal 29 to interconnected contacts 35 in the lowermost band of rotary switch A. This bank is swept over by wiper 36 which is connected to interrupting contacts *a* under control of motor magnet 27. The circuit connections through the winding of motor magnet 27 are traceable to ground through contact *b* of relay 30.

The homing circuit for rotary switch B is similar to that described in the foregoing paragraph, the only difference being that the interrupting contacts *a* of motor magnet 28 are fed with positive potential through wiper 37 and the return circuit for motor magnet 28 extends to ground through a back contact of the transfer contact group *b* in relay 30.

*Progressive read-out of a group of stored items*

In the embodiment of Fig. 4 I have provided a series of indicator lamps L1, L2 . . . L12 sufficient in number for concurrently visualizing the read-out of a group of storage units, either the group 14, 15, 16 or the group 17, 18, 19. Each lamp is individually connected in series with the discharge path of a gaseous trigger tube T1, T2 . . . T12. Lamps and trigger tubes other than those individually shown are collectively represented by the block LT.

The gaseous trigger tubes are prepared for a read-out operation by connecting all of their cathodes to ground through make contacts in one or the other of two manually operable keys G and H. These keys also prepare other circuits for a selected read-out operation so as to obtain an indication of what is stored in the storage unit group 14, 15, 16, or else in the group 17, 18, 19. The control grids of each tube T1, T2 . . . T12 are individually connected to the pairs of corresponding segments in the rotary switch banks that are associated with wipers 42 and 43. These wipers are respectively connected to front and back contacts of transfer group *c* in relay 30. The movable contact of this group *c* is connected to ground through the secondary winding of transformer 41. This transformer has previously been referred to in its association with a bridge network having junction points C, D, E and F. The function and mode of operation of the network is the same in the two embodiments of Figs. 3 and 4.

The read-out process as performed by the use of selector keys G and H (Fig. 4) differs from the one described in reference to Fig. 3 chiefly in respect to the circuit arrangements. But in Fig. 4 either one of the rotary switches A or B may be caused to make an excursion while the corresponding key G or H is held operated. At each position of the wipers a different trigger tube will have its grid connected to the secondary of transformer 41 and simultaneously the bridge network will have a selected one of the storage units connected between its junction points C and E. There follows a more detailed description of the circuit arrangement for read-out purposes:

Any one of the triggering circuits starts at —C source, thence through the secondary winding of transformer 41, through contact *c* of relay 30, through either its front contact or its back contact depending upon whether relay 30 is operated or not, and thence through one or the other of the wipers 42—43 and a contacted segment to the grid circuit of a selected gaseous trigger tube of the group T1, T2 . . . T12. The grid circuits of these tubes each include a grid resistor 47 connected to the negative terminal of a biasing source labeled —C. The positive terminal of this source will be understood to be grounded.

The condition of low inductance in the core 2 of a selected storage unit due to the orientation of its magnetism will cause an appropriate one of the gaseous trigger tubes to be ignited. The current flow through such a tube will, therefore, light up a lamp of the group L1, L2 . . . L12 to indicate that a mark signal has been stored in the storage unit. These lamps are respectively disposed, each in the anode circuit of one of the trigger tubes. The cathodes of the trigger tubes are grounded either through contact *c* in key G or through contact *b* in the key H, depending upon which of these keys is operated. When one of these keys is released after operation, the cathode grounding circuit is opened and both the trigger tube and lamp are extinguished.

By the showing of two read-out keys G and H I have illustrated one simple form of procedure wherein, if a certain group of storage units is to be interrogated and no consideration is to be given to another group or groups of storage units, the selection of one of the keys G and H confines the interrogation to the selected group.

Considering key G for example, its key lever 22 is swung so as to complete four different circuits through its contacts *a*, *b*, *c* and *d* respectively, and to open its contacts *e*. Closure of contacts *a* causes relay 30 to be energized, the same as has been described above with reference to the reception of the first group of incoming signals. Thus the control of relay 30 by key G takes the place of such control by the slow release relay 32. Relay 30 is now held operated until key G is released.

Closure of contacts *b* in key G causes a positive pulse to be applied to a homing segment 45 in the bottom bank of rotary switch A, this bank having associated therewith a wiper 36 which is connected to the motor magnet 27 through its self-interrupting contacts *a*. This circuit closure through segment 45 and through the winding of motor magnet 27 starts a stepping movement of the rotary switch A which will enable all of the storage units 14, 15 and 16 to be interrogated. When the interrupter contacts *a* open, it will be seen that wiper 36 is stepped over to the first of the series of interconnected segments 35 and further steps are taken successively by the rotary switch A until wiper 36 again contacts the homing segment 45.

If a scanning cycle of the rotary switch should be completed before releasing the key G, a start pulse will again be applied to the motor magnet 27 through the homing contact 42. This, however, will have no adverse effect because, as soon as wiper 36 has made any progress whatsoever along the interconnected segments 35, its second cycle will be completed after releasing the key G due to the connection of the segments 35 to the positive source terminal 29 through normally closed contacts *b* of relay 32. The repetition of read-out operations which would result from prolonged closure of key G will only reaffirm the read-out operations which occur during the first cycle of rotary switch A. The opening of the key G, however, prevents further cycling of the rotary switch, since the start circuit through segment 45 will no longer be closed.

In view of the above description with respect to the read-out of stored signals in the group of solenoids 14, 15 and 16, it will be clear that the same procedure may be followed with respect to the read-out of signals stored in storage units 17, 18 and 19. In the latter case, however, key H is operated in order to cycle the rotary switch B through at least one series of steps between one and the next homing stop.

When key H is operated it is necessary to energize relay 31 and to release relay 30. This is accomplished by closure of contact *a* in key H. When ground potential is applied to the conductor interconnecting the windings of relays 30 and 31, contacts *a* of relay 30 being presumably closed, there will be no potential drop through the winding of relay 30 but the winding of relay 31 (in series with resistor 34) will be connected across the D. C. source.

Under the conditions stated in the previous paragraph, ground potential is applied to the back contact of group *b* in relay 30, thus enabling motor magnet 28 to respond to stepping pulses applied by its interrupter contacts *a*. The first pulse so applied comes through a circuit which may be traced from the positive source terminal 33 to contacts *c* of key H, to the start segment 46 in the lowermost bank of rotary switch B, through wiper 37 and thence to interrupter contacts *a* and through the winding of motor magnet 28 to ground. The successive pulsing steps to be applied to motor magnet 28 for cycling the rotary switch are taken as a result of wiper 37 having reached the interconnected segments 44 in the lowermost bank of rotary switch B. These segments, the same as segments 35 in rotary switch A, are all connected through normally closed contacts *b* in relay 32 to the positive source terminal 29.

The read-out operations as performed with respect to the interrogation of storage units 17, 18 and 19 have the same effect to control the trigger tubes T1, T2, etc., so as to illuminate lamps L1, L2, etc., in accordance with the read-out of mark pulses as stored in the storage units. The operation of the bridge network is by way of connecting the secondary winding of transformer 41 through the back contact of the transfer group *c* in relay 30, and thence through wiper 43 and individual segments of the middle bank in rotary switch B to the grid circuits of the trigger tubes T1, T2, etc. All switching connections to the trigger tubes and to the respective storage units are synchronized, since wipers 26 and 43 are stepped in unison.

When the key H is released the opening of its contacts *a* removes ground potential from the upper terminal of resistor 34, causing relay 31 to release. At this time, however, relay 30 having stood unoperated will not be locked up.

If key H were to be closed when both relays 30 and 31 happened to be de-energized, relay 31 would be locked up during the closure of key H and relay 30 would remain unoperated, as is required for reading signals out of storage units 17, 18 and 19. Hence, it is possible to make two successive readings of these storage units at different times separated by a period when lamps L1 and L2, etc., would be extinguished by the release of key H.

In order to insure the application of trains and incoming signals, first to the storage units 14, 15 and 16, and subsequently to the units 17, 18 and 19, it is necessary to have both of the relays 30 and 31 restored to inoperativeness after every read-out operation. So, regardless of which of the keys G or H is operated, it is necessary to apply ground potential to the upper terminal of resistor 34. Key G therefore has a back contact *f* which is closed by reversing the direction of operation of its key lever 22. The operator is to be instructed always to restore the equipment to normal by this reverse throw of key lever 22 after using the same for a read-out operation. This restores the de-energized conditions to relays 30 and 31. Contacts *f* when closed put ground potential on the upper terminal of resistor 34, the same as is done when key H is closed.

If the interrogation of all of the storage units were to be desired in quick succession, key G should first be operated in order to operate relay 30 and to store the signals read out from units 14, 15 and 16 in the lamps L1, L2, etc. Then, when the lamp indications have been copied, key G may be released without the necessity for the reverse movement of lever 22, because the subsequent closure of key H will perform the same operation of energizing relay 31 and releasing relay 30 as would be accomplished by that reverse operation of key G.

In order to lock out the recording circuits of the common equipment against adverse effects by incoming signals when obtaining a read-out of operation, the line through the windings of relays 21 and 24 is extended through a series circuit which traverses normally closed contacts *e* of keys G and H respectively. Either of these keys when operated opens the line. On releasing either of these keys, however, the line is restored to an operable condition and the common equipment is made ready to receive the incoming signals in proper order by successive operation of rotary switches A and B, all as has been described above.

*Operation of the magnetic storage unit in theory*

When a storage element is energized by a sufficiently strong pulse the magnetically hard core saturates. After termination of the pulse there is a partial decay of the magnetic flux, but it still remains at a high level.

If a read-out pulse of the same polarity as the recording pulse is applied and cut off, the flux will momentarily rise and fall and will resume the same high level as before. A read-out pulse of opposite polarity will, however, cause the flux to drop more or less, depending upon the strength of the pulse itself.

Since the purpose of applying a read-out pulse is to determine the polarity of the flux in the storage element and to avoid loss or weakening of the stored signal, very weak read-out test signals should be used. Such signals, even though there is a succession of them, will cause the core flux to drop somewhat, yet, if applied in a demagnetizing sense, the hysteresis of the core will restore the magnetic state to a stable value only slightly less than what it was before the test signal was applied.

If the storage unit is intended to record mark signals as a state of nearly saturated magnetic flux and space signals as a substantially demagnetized state, then the applied D. C. pulses of opposite polarity should be of unequal strength and the magnitude of the weaker pulse (the space signal) should be so chosen as to cancel out the residual flux which remained after recording a mark pulse.

Control of the storage unit as in the preceding paragraph presents no difficulty when repeating the application of space signals (relatively weak pulses) without intervening mark signals. This is true because a pulse of intermediate (non-saturating) magnitude produces only a very small residual flux.

When it is desired to store trinary signals I prefer to represent + and — signals by pulses of saturating strength and opposed polarity for recording the positive and negative code elements and by a surge of alternating current for recording a neutral or "0" code element. It will be apparent to those skilled in the art that the residual states of magnetization produced by such pulses will be independent of the previous polarity or neutral polarization of the core in the storage unit.

For purposes of obtaining a read-out of what is stored in the storage units of my invention I have found that the different states of magnetization of the core in any of these units may be distinguished, since the residual flux level and its orientation influences the so-called "inductance" of the read-out circuit. The term "inductance" as used in this specification and in the claims refers to the time-varying ratio between the voltage and current of a read-out pulse.

Ways and means well-known in the art are available for detecting the inductance characteristic of a read-out circuit as referred to in the preceding paragraph. Using laboratory equipment, including an oscilloscope, the flux strength and orientation of the core in the storage unit is observable. Use of a bridge circuit, such as has been described in the foregoing parts of the specification, constitutes a simpler method. Then, again, if suitable means were to be provided for generating read-out pulses of constant strength and uniform duration, the detection of the magnetic state in the storage unit core is possible without using a bridge circuit, but by direct control, for example, of the grid in a gaseous discharge tube to overcome its negative bias or not to do so, as the case may be. This form of detection may also be adopted when three alternative states of magnetic storage are required, as in a memory system for trinary code. In this case any of several well-known circuit arrangements may be employed, wherein the wave shape or amplitude of an alternating test current application for a brief moment will yield one or another of three different secondary effects, depending upon the orientation of the core flux or upon its de-magnetized state. For example, these secondary effects may be such as to develop positive or negative voltages for triggering gaseous discharge tubes selectively, and when neither the positive nor the negative voltage is of sufficient magnitude to cause the triggering of either tube in a push-pull circuit the indication would be that of a de-magnetized state in the storage unit. Also the selective response to the read-out signal may depend upon an unbalance of D. C. components therein, or upon the relative magnitudes of positive and negative voltage peaks in the signal wave, or upon phase differences.

It will be understood by those skilled in the art that the circuit arrangements which have been hereinabove described and shown in the drawing are capable of modification in various ways to meet the requirements for a data storage system having any number of storage units. The circuits as illustratively shown herein are, therefore, to be considered as only two of many possible arrangements for carrying out the invention. In place of rotary switches, various well-known arrangements of relays may be used. Other switching means well known in the art are also available for accomplishing the same purpose. The scope of the invention, however, is defined by the claims to follow.

I claim:

1. A data storage device comprising a solenoid, a ferro-magnetic core member having a remanence sufficiently high to maintain the core member substantially in a saturated state within said solenoid and forming part of a substantially closed magnetic circuit, recording circuit means for energizing said solenoid to obtain a desired polar orientation and a corresponding remanent magnetization in said core member, thereby to store the significance of an applied data signal, and reading circuit means comprising a coil having a predetermined inductance and including a circuit for comparing the inductance of said coil with the inductance of said solenoid, thereby to manifest the orientation effect of said magnetization, and means for applying a relatively weak signal to said comparison circuit to protect the data record against loss from appreciable de-magnetization.

2. A data storage device comprising a solenoid, a substantially closed magnetic circuit having a portion which constitutes a core within said solenoid, said magnetic circuit being composed in part of magnetically hard material and in part of magnetically soft material, said magnetically hard material having a remanence sufficiently high to maintain the material substantially in a saturated state, recording circuit means for energizing said solenoid, thereby to polarize the hard magnetic material in either of two directions depending on the direction of current flow through said solenoid, said means being capable of producing magnetic saturation in said core, a reading circuit comprising means for applying a source of relatively weak signals to said solenoid, and indicating means under control of said weak signals and operable to manifest the polar orientation one way or the other of the magnetized state within said core.

3. A data storage system comprising a plurality of devices characterized according to claim 2 in combination with selective means for operably controlling different ones of said devices to record digital data therein, and selective means for operably connecting said reading circuit means to a particular one of said devices for producing a manifestation of the data stored therein.

4. A system for storing and extracting information by the use of a static magnetic storage device, said device comprising a solenoid and a magnetic circuit including a core having a retentivity sufficiently high to maintain the core substantially in a saturated state which is linked to said solenoid, means for impressing a relatively strong signal pulse of one or the opposite polarity through the winding of said solenoid, according to the sense of the information to be stored, means for thereafter impressing a relatively weak signal of fixed polarity on said winding, and means for indicating one or another of different inductance effects which are derivable from said weak signal.

5. A system for storing and extracting information by the use of a static magnetic storage device, said device comprising a solenoid and a magnetic circuit including a core having a retentivity sufficiently high to maintain the core substantially in a saturated state which is linked to said solenoid, means for impressing a relatively strong signal through the winding of said solenoid, said signal being chosen as one of three types, namely (1) a direct current pulse of plus polarity, (2) a direct current pulse of minus polarity, and (3) an alternating current pulse; means for thereafter impressing a relatively weak signal of fixed polarity through the winding of said solenoid, and means for indicating one or either of the other two of the inductance effects which are derivable from that impress of the weak signal.

LAWRENCE J. KAMM.

(References on following page)

REFERENCES CITED

The following references are of record in the file of this patent:

UNITED STATES PATENTS

| Number | Name | Date |
|---|---|---|
| 1,983,388 | Moore | Dec. 4, 1934 |
| 2,236,793 | Furber | Apr. 1, 1941 |
| 2,390,051 | Barth | Dec. 4, 1945 |
| 2,412,046 | Hoare | Dec. 3, 1946 |
| 2,441,984 | Armstrong | May 25, 1948 |
| 2,481,282 | Bialous | Sept. 6, 1949 |
| 2,519,513 | Thompson | Aug. 22, 1950 |
| 2,564,403 | May | Aug. 14, 1951 |

OTHER REFERENCES

Magnetic Delay-Line Storage, An Wang; Proceedings of the I. R. E., April 1951 (report submitted November 1948).